US012752415B2

(12) United States Patent
Hurley

(10) Patent No.: US 12,752,415 B2
(45) Date of Patent: Oct. 6, 2026

(54) SOCKET TOOL HOLDER

(71) Applicant: Jonathan Hurley, Columbia Falls, MT (US)

(72) Inventor: Jonathan Hurley, Columbia Falls, MT (US)

( * ) Notice: Subject to any disclaimer, the term of this patent is extended or adjusted under 35 U.S.C. 154(b) by 0 days.

(21) Appl. No.: 18/889,194

(22) Filed: Sep. 18, 2024

(65) Prior Publication Data

US 2026/0077474 A1 Mar. 19, 2026

(51) Int. Cl.

*B25H 3/00* (2006.01)
*B25B 13/06* (2006.01)
*B25H 3/06* (2006.01)

(52) U.S. Cl.

CPC ............. *B25H 3/003* (2013.01); *B25B 13/06* (2013.01); *B25H 3/06* (2013.01)

(58) Field of Classification Search

CPC ... B25H 3/00; B25H 3/06; B25H 3/04; B65D 25/101; B65D 85/20; A47F 7/00
USPC .................................................. 206/372, 376
See application file for complete search history.

(56) References Cited

U.S. PATENT DOCUMENTS

| | | | | |
|---|---|---|---|---|
| 1,750,011 A * | 3/1930 | Kneier | B25B 13/56 206/375 |
| 3,728,884 A | 4/1973 | Santoll | |
| 3,835,737 A | 9/1974 | Carr | |
| 4,102,375 A | 7/1978 | Rossini | |
| 4,205,444 A | 6/1980 | Weissman | |
| 4,270,903 A | 6/1981 | Nash | |
| 5,002,416 A * | 3/1991 | Serzen | B42F 13/00 402/80 R |
| 5,066,230 A | 11/1991 | Weissman | |
| 5,511,673 A * | 4/1996 | Folk | B25H 3/003 206/378 |
| 6,202,864 B1 * | 3/2001 | Ernst | A47F 7/024 206/372 |
| D594,511 S * | 6/2009 | Smyth | D21/345 |

(Continued)

FOREIGN PATENT DOCUMENTS

| | | |
|---|---|---|
| CN | 20722301 U | 4/2018 |
| CN | 116276305 A | 6/2023 |

(Continued)

OTHER PUBLICATIONS

Amazon.com, ToolBox Widget Socket Orginizer Pro series-Modular Magnetic socket holder; Mar. 6, 2022 (Year: 2022).*

(Continued)

*Primary Examiner* — Ernesto A Grano
(74) *Attorney, Agent, or Firm* — Christensen O'Connor Johnson Kindness PLLC

(57) ABSTRACT

A socket tool holder 100 for holding and supporting a socket tool 102 in upright orientation includes a base section 104 and a stem 106 that extends upwardly from the base section and through the socket tool 102 to terminate above top of the socket tool. An indicia 108 is located at the top of the stem to indicate some aspect of the socket tool 102 being held, in this case that the size of the socket tool is 15 mm and 16 mm, respectively. A plurality of reduced size sections or locations 140 are spaced apart along the length or height of the stem 106. The reduced size sections serve as locations where the stem 106 can be conveniently severed to thereby adjust the length of the stem to the length or depth of the socket tool 102.

20 Claims, 7 Drawing Sheets

(56) References Cited

U.S. PATENT DOCUMENTS

| | | | | |
|---|---|---|---|---|
| D637,815 | S * | 5/2011 | Hsieh | D3/313 |
| 8,181,780 | B1 | 5/2012 | Guffey et al. | |
| D697,340 | S * | 1/2014 | Vardaro | D6/675.1 |
| 8,875,884 | B1 * | 11/2014 | Lee | B25H 3/04 206/378 |
| 8,992,229 | B2 * | 3/2015 | Spital | A63F 9/00 434/259 |
| D744,751 | S * | 12/2015 | Weng | D3/288 |
| D747,103 | S * | 1/2016 | Amash | D3/304 |
| 9,975,237 | B2 * | 5/2018 | Norris | B25H 3/06 |
| 10,040,189 | B2 * | 8/2018 | Kao | A47F 7/0028 |
| 10,421,175 | B2 * | 9/2019 | Chou | B25H 3/04 |
| 10,675,750 | B1 * | 6/2020 | Winnard | G09F 3/02 |
| D897,138 | S * | 9/2020 | Thain | D6/682.3 |
| 11,103,989 | B2 * | 8/2021 | Hurley | H01F 7/0252 |
| 11,110,589 | B2 * | 9/2021 | Hurley | H01F 7/0252 |
| 11,717,954 | B2 * | 8/2023 | Heath | B25H 3/02 206/372 |
| 11,931,813 | B2 | 3/2024 | Chen et al. | |
| 11,986,944 | B1 * | 5/2024 | Kao | B25H 3/04 |
| D1,031,399 | S * | 6/2024 | Herritz | D8/71 |
| 12,239,307 | B2 * | 3/2025 | Garcia-Bengochea | A61B 17/0218 |
| 12,390,210 | B2 * | 8/2025 | Garcia-Bengochea | A61B 17/0293 |
| 2003/0052069 | A1 * | 3/2003 | Santa Cruz | A47F 7/0028 248/89 |
| 2003/0213760 | A1 * | 11/2003 | Lee | B25H 3/003 206/378 |
| 2007/0226985 | A1 | 10/2007 | Paton et al. | |
| 2007/0258757 | A1 | 11/2007 | Griffin, Jr. | |
| 2009/0049959 | A1 | 2/2009 | Gibbs | |
| 2010/0065520 | A1 | 3/2010 | Hsieh | |
| 2010/0163502 | A1 * | 7/2010 | Chang | B25H 3/04 211/70.6 |
| 2013/0126630 | A1 * | 5/2013 | Majerowski | A61L 9/12 239/57 |
| 2014/0305824 | A1 * | 10/2014 | Hsieh | B25H 3/04 206/378 |
| 2015/0174665 | A1 | 6/2015 | Wretland et al. | |
| 2017/0190047 | A1 * | 7/2017 | Kao | F16B 1/00 |
| 2023/0124359 | A1 | 4/2023 | Yanagihara et al. | |
| 2023/0219210 | A1 * | 7/2023 | Chang | B25H 3/003 206/349 |
| 2024/0189928 | A1 | 6/2024 | Bojanowski et al. | |

FOREIGN PATENT DOCUMENTS

| | | | |
|---|---|---|---|
| DE | 2946552 | C2 | 4/1990 |
| DE | 102013005784 | A1 | 10/2014 |
| EP | 0813846 | A1 | 12/1997 |
| GB | 2 068 788 | A | 8/1981 |
| KR | 102012084512 | A | 7/2012 |

OTHER PUBLICATIONS

Danford, M., "A Machinist's Guide to Toolholder Maintenance", <https://www.mmsonline.com/articles/a-machinists-guide-to-toolholder-maintenance>, Dec. 14, 2011, 8 pages.

Toolbox Widget, "19 SAE Size Stems for 1/2" Drive Sockets", <https://toolboxwidget.com/products/1-2-socket-size-stems-sae?_ab=0&_fd=0&_sc=1>, 2022, 10 pages.

Work Force Development, "Toolholding Systems," <https://www.workforcedevelopment.com/pdf/sample/Sample_Lesson_Toolholding_Systems.pdf>, Aug. 28, 2014, 74 pages.

Extended European Search Report mailed Feb. 6, 2026, issued in corresponding European Patent Application No. 25202415.3, filed Sep. 16, 2025, 7 pages.

* cited by examiner

SOCKET TOOL HOLDER

BACKGROUND

The present disclosure pertains to tool holders and organizers, and in particular to a holder and organizer for socket tools and is adjustable to the size and depth of a socket tool while indicating the size of the socket tool. Socket tools are available not only in different sizes for engaging different size nuts, bolts and other hardware, but also a are available with different size drive sockets, for example, ¼ inch, ⅜th inch, ½ inch and even larger drive sockets. Socket tools also are available in a wide range of depths, from "short" to very deep socket tools.

The present disclosure provides a socket tool holder and organizer that accommodates socket tools of various sizes, of various drive socket sizes and of various depths, from "short" to very deep.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a socket tool holder is provided. The socket tool holder includes a base and an elongate stem engageable with the base to extend upwardly from the base, the stem of a width sized to pass through a socket tool being held, the stem configured with reduced size width sections spaced apart along the height of the stem.

In any of the embodiments described herein, wherein the reduced size width sections are selected from the group consisting of a reduced size width section extending across one side of the stem, two reduced sized width sections extending across the side of the stem, a plurality of reduced size width sections extending across the side of the stem, a reduced size width section extending partially around the side of the stem, and a reduced size width section extending completely around the stem.

In any of the embodiments described herein, wherein the reduced size width sections are selected from the group consisting of a groove, a channel, a cut, and a score line.

In any of the embodiments described herein, wherein the stem further comprises an exterior surface and a ring extending at least partially around the stem to protrude from the exterior surface of the stem.

In any of the embodiments described herein, wherein a ring is located between the locations of the reduced size width sections.

In any of the embodiments described herein, wherein a ring is associated with each of the reduced size width sections.

In any of the embodiments described herein, wherein the stem comprises a proximal end portion engageable with the base and distal end portion opposite the proximal end portion, the distal end portion being configured to receive or display indicia pertaining to the socket tool corresponding/related to the socket tool holder.

In any of the embodiments described herein, wherein the indicia pertaining to the size of the socket tool held by the socket tool holder.

In any of the embodiments described herein, wherein the distal end portion of the stem is configured as a display surface disposed diagonally relative to the length of the stem, the indicia being positioned on the display surface.

In any of the embodiments described herein, wherein the indicia pertains to the size of the socket tool held by the socket tool holder.

In any of the embodiments described herein, wherein the indicia is mountable on the display surface.

In any of the embodiments described herein, wherein the indicia is mountable on the distal end portion of the stem;

In any of the embodiments described herein, wherein the base includes an opening to receive the stem therein.

In accordance with one embodiment of the socket tool holder of the present disclosure, wherein the stem further comprises an exterior surface and a ring extending at least partially around the stem to protrude from the exterior surface of the stem; and the base includes a groove in the base opening to snugly receive the ring therein.

In any of the embodiments described herein, wherein the base comprises lugs sized and shaped to engage with the drive socket of a socket tool In any of the embodiments described herein, wherein the lugs comprise an opening for receiving the stem therein.

In any of the embodiments described herein, wherein the lugs are configured to be engageable with a support structure In any of the embodiments described herein, wherein the support structure is configured to be connectable to at least one adjacent support structure.

In any of the embodiments described herein, wherein the support structure comprises a platform member and at least one tongue protruding from the platform member to engage with a recess formed in the platform member of an adjacent support structure.

In any of the embodiments described herein, wherein the support structure comprising a tray structure.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
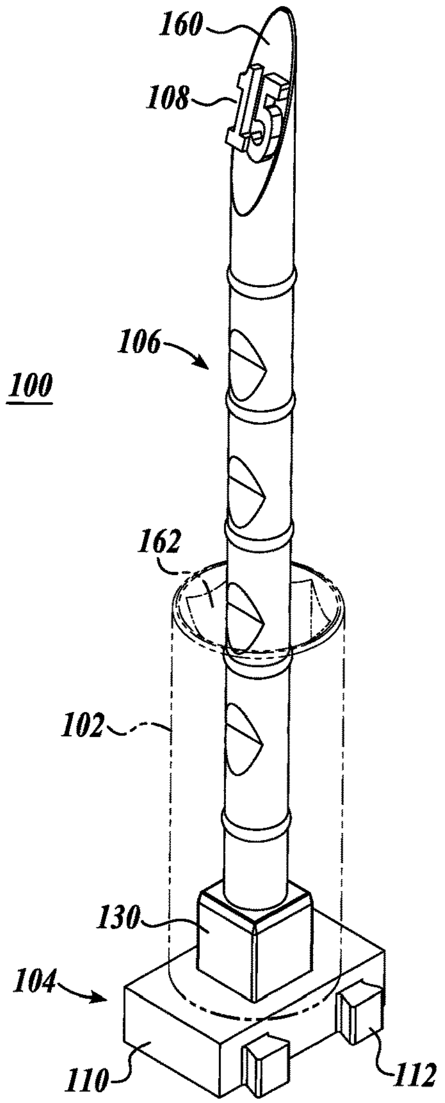
FIG. 1A is a pictorial view of a socket tool holder of the present disclosure showing holding a socket tool.

Various example embodiments of the present disclosure are described below with reference to the accompanying drawings in which some example embodiments are illustrated. In the figures, the thicknesses of lines, layers and/or regions may be exaggerated for clarity.

While example embodiments are capable of various modifications and alternative forms, embodiments thereof are shown by way of example in the figures and are described in detail below. It should be understood, however, that there is no intent to limit example embodiments to the particular forms disclosed, but on the contrary, example embodiments are to cover all modifications, equivalents, and alternatives falling within the scope of the disclosure.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be considered in the specific context this definition is given herein.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

The present application may include references to directions, such as "forward," "rearward," "front," "back," "ahead," "behind," "upward," "downward," "above," "below," "top," "bottom," "right hand," left hand," "in," "out," "extended," "advanced," "retracted," "proximal," "distal," "central," "vertical," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definite, the applicable parameter is within five percent (5%) of the designated parameter value.

Further, the term "mechanic's tools" may include all manner of tools used by mechanics, including, but not limited to, wrenches, pliers, screw drivers, sockets, socket wrenches, rachet wrenches, hex wrenches, etc.

The present application refers to "reduced size width sections" of a stem for holding a socket tool. The "reduced size width sections" are also referred to "reduced size locations," "reduced size sections," "reduced size locations", "reduced width sections", "reduced width locations," or "notches."

In the following description, various embodiments of the present disclosure are described. In the following description and in the accompanying drawings, the corresponding systems assemblies, apparatus, and units may be identified by the same part number, but with an alpha suffix or by a prime ("'") or double prime ("''") or even a triple prime ("'''") designation. The descriptions of the parts/components of such systems assemblies, apparatus, and units that are the same or similar are not repeated so as to avoid redundancy in the present application.

Figure 1B:
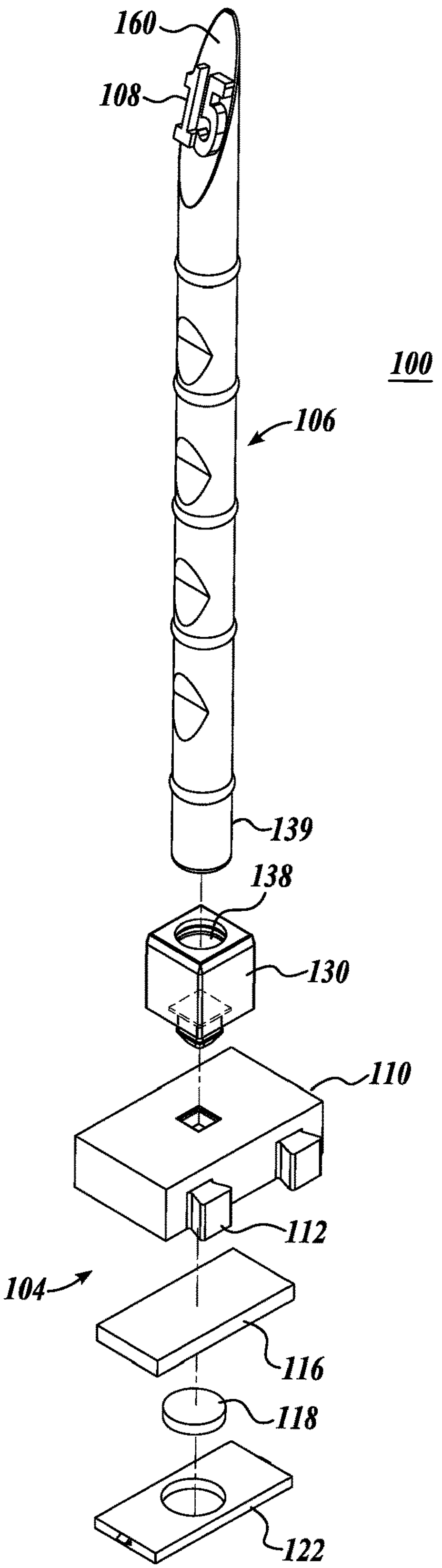
FIG. 1B is a view similar to FIG. 1A, but with the components of the socket tool holder shown in exploded view.
Figure 2:
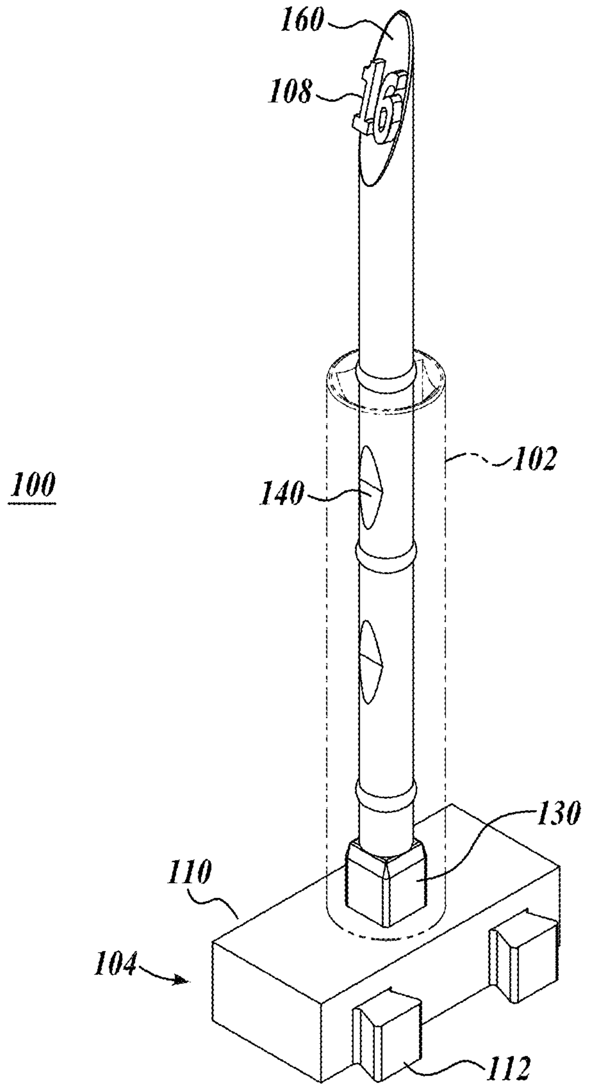
FIG. 2 is a view similar to FIG. 1A, but holding a socket tool having a smaller drive socket and deeper socket head than the socket tool shown in FIG. 1A.

Referring initially to FIGS. 1A, 1B, and 2, in one embodiment of the present disclosure, a socket tool holder 100 is shown as holding and supporting a socket tool 102 in upright orientation. The socket tool holder includes a base 130 and a stem 106 that extends upwardly through the socket tool 102 to terminate above the top of the socket tool. An indicia 108 is located at the top of the stem to indicate some aspect of the socket tool 102, in this case that the size of the socket tool is 15 mm and 16 mm, respectively.

Figure 3A:
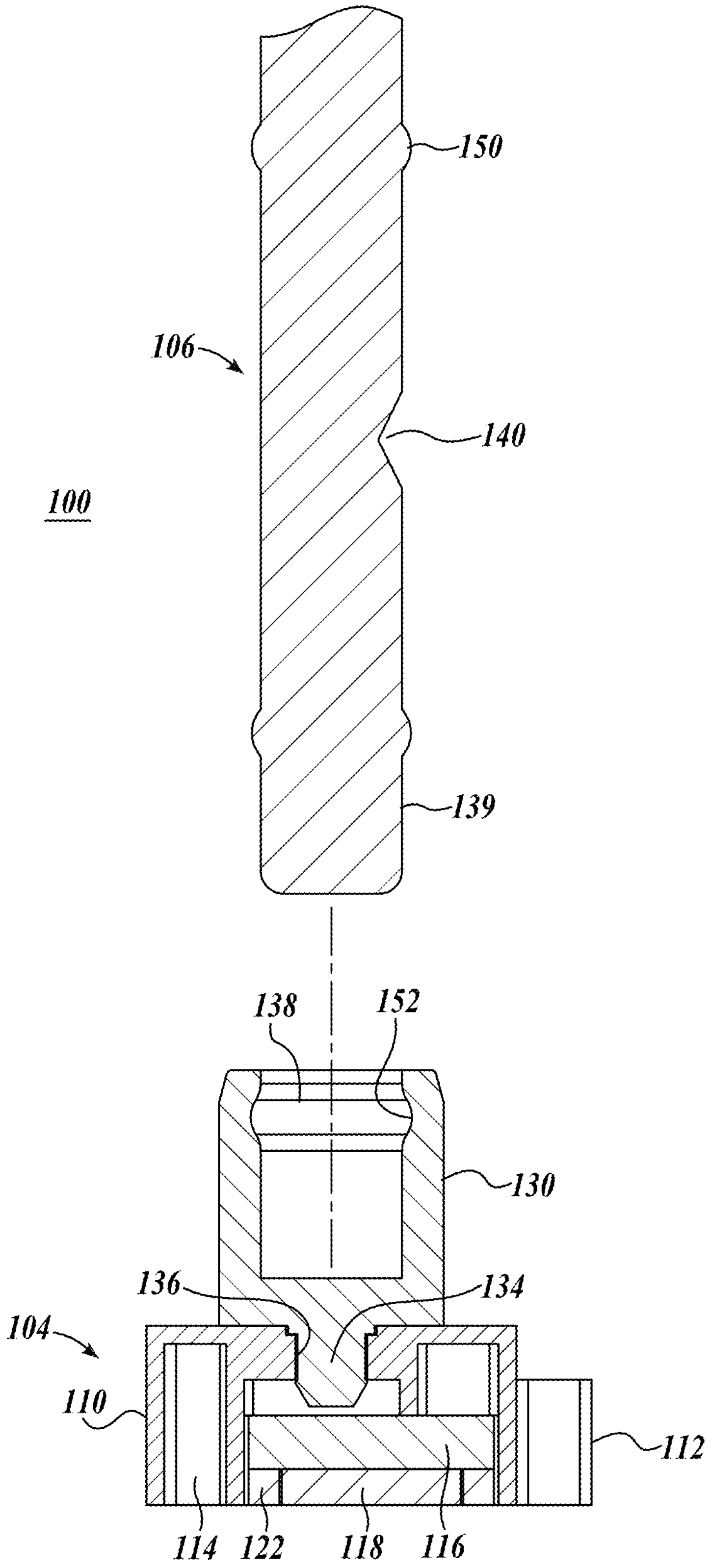
FIG. 3A is an enlarged cross-sectional view of a socket tool holder with the stem detached from the base.
Figure 3B:
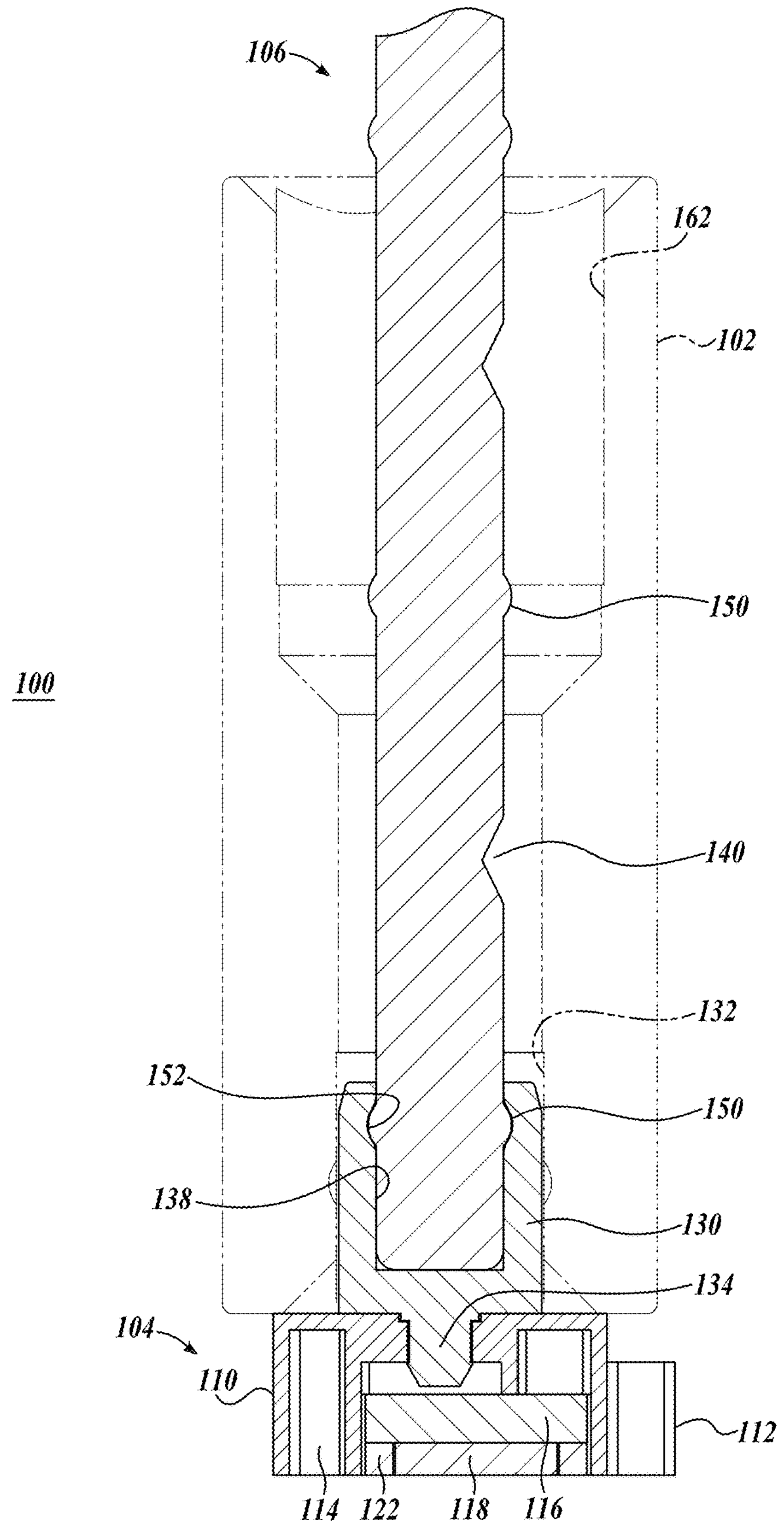
FIG. 3B is a view similar to FIG. 3A, with the stem assembled with the base and holding a socket tool.

To describe the socket tool holder 100 in more detail, and to also refer to FIGS. 3A and 3B, the base 130 is mounted on a support structure 104 that includes platform member 110. Although the platform member 110 is shown as rectangular in shape, it can be constructed in other shapes. Also, the platform member 110 is shown as supporting a single stem 106; however, the base member can be size to support a plurality of stems 106.

The support structure 104 is configured to be attachable to adjacent support structures. One way of accomplishing this is through the use of one or more tongues 112 projecting from the platform member 110. The tongue(s) is/are shaped and sized to be engageable with groove(s) 114, formed the adjacent side of an adjacent platform member. See FIGS. 3A and 3B. Of course, other types of systems can be used to connect adjacent base members 110.

As shown in FIGS. 1B, 3A, and 3B, the support structure 104 includes a metallic plate 116 that is positioned at the underside of the platform member 110. In addition, a magnet 118 is disposed within an opening 120 formed in a retaining plate 122 which is positioned in-face-to face relationship to the underside of the metallic plate 116. Although the magnet 118 is shown as being of a round or disk shape, the magnet can be of other shapes, and the opening 120 can be shaped to closely receive the magnet. It can be appreciated that the use of the metallic plate 116 in conjunction with the magnet 118 greatly increases magnetic strength of the support structure 104. This construction of the support structure 104 enables the holder 110 to be mounted and held in place on a ferromagnetic surface.

The base 130 is in the form of a lug that is disposable on the top surface of the platform member 110 to extend upwardly therefrom. The base/lug 130 is sized and shaped to receive the drive head 132 of the socket tool 102. As noted above, socket tools 102 are constructed with a drive head 132 at the base of the socket tool to receive the drive lug of a rachet wrench. Ratchet wrench drive lugs are square in cross section and are of various sizes, including for example, ¼ inch, ⅜ inch, ½ inch and even larger. Accordingly, the lug 130 is also square in cross section, and can be of various sizes including, for example, ¼ inch, ⅜ inch, ½ inch and larger. The lug 130 simulates the drive lug of a ratchet wrench.

The lug 130 can be secured to the platform member 110 by numerous different means. As one example, a square shape stub 134 can project downwardly from the underside of the lug 130 to be receivable within a correspondingly shaped opening or cavity 136 formed in the upper side of the platform member 110. Of course, other means can be used in place of the stub 134 and cavity 136.

A circular opening 138 extends downwardly into the lug 130 to receive the base portion 139 of stem 106. If the stem 106 is of a cross-sectional shape other than circular, then the opening 138 is shaped to correspond with the cross-sectional shape of the stem. For example, the stem can be in cross section triangular, square, pentagonal, hexagonal, octagonal, etc. The stem 106 is sized to be snuggly receivable within the opening 138 formed in the lug 130 to extend upwardly from the platform member 110 so that a socket tool 102 is receivable over and thereby held by the stem.

The stem 106 is constructed with a plurality of reduced size width sections or locations 140 spaced apart along the length or height of the stem. The reduced size width sections 140 serve as locations where the stem 106 can be conveniently severed to thereby adjust the length of the stem to the length or depth of the socket tool 102. In this regard, the length of the stem can match the length of the socket tool.

The stems 106 can be of various overall lengths to accommodate socket tools of various depths. As examples only, the length of a stem 106 sized to hold a socket tool having a ¼ inch drive socket, can be of from about 40 to 80 mm in length, but also can be of other lengths. As an example, only, the length of a stem 106 sized to hold a socket tool having a ⅜ inch drive socket, can be of from about 60 mm to 100 mm in length, but also can be of other lengths. As another example only, the length of a stem 106 sized to hold a socket tool having a ½ inch drive socket, can be of from about 80 mm to 120 mm in length, but also can be of other lengths. As noted above, the lengths of the stems 106 are by way of example only. The stems can be shorter than in the above examples, for example, 10, 20, 30 mm shorter. Likewise, the stems 106 can be longer than in the above examples, for example from 10 to 50 mm longer.

The spacing between reduced size sections or locations 140 can be uniform and can vary along the length of the stem 106. For example, such spacing can be closer together toward the base portion 139 of the stem, to accommodate socket tools 102 of various shorter lengths. As an example only, the spacing between the reduced size sections/locations 140 can be from about 8 mm to about 20 mm.

The reduced size sections 140 can be of various shapes or configurations. The reduced size sections 140 are shown in FIGS. 1A through 4 in the form of shallow grooves or notches. However, the reduced size sections/notches 140 can be of other configurations. For example, the reduced size sections/notches 140 can be in the form of a channel, a cut, a score line, or other configuration.

The reduced size sections or notches 140 are shown as being located transversely along one side of the stem 106. However, the reduced size sections 140 can be at other locations on the stem 106. For example, there could be two reduced size sections 140 on diametrically opposite sides of the stem 106. As another example, the reduced size section 140 may be in three locations about circumference of the stem 106. As a further example, the reduced size section 140 may be continuous about part of the circumference of the stem 106 or even about the entire circumference of the stem 106. It is to be understood that the purpose of the reduced size sections is to enable the stem to be severed at a selected reduce size location so that the stem maybe adjusted to a length corresponding to the depth of the socket tool 102 to be held, while retaining sufficient structural integrity to not be easily damaged during use.

The depth of the reduced size sections 140 can depend on the width or diameter of the stem. For example, in FIG. 4 the diameter of the stems designated as "16", for use with a 16 mm socket tool, may be about from 3.2 mm to 3.6 mm in diameter and designed for ¼th in socket drivers. In this situation, the reduced size sections 140 may be in the form of about from about 0.5 mm to about 0.7 mm deep grooves. This depth of the reduced size section grooves 140 is sufficient for the stem to be conveniently severed, but still strong enough to securely support socket tools used with ¼th inch socket drivers.

Figure 4:
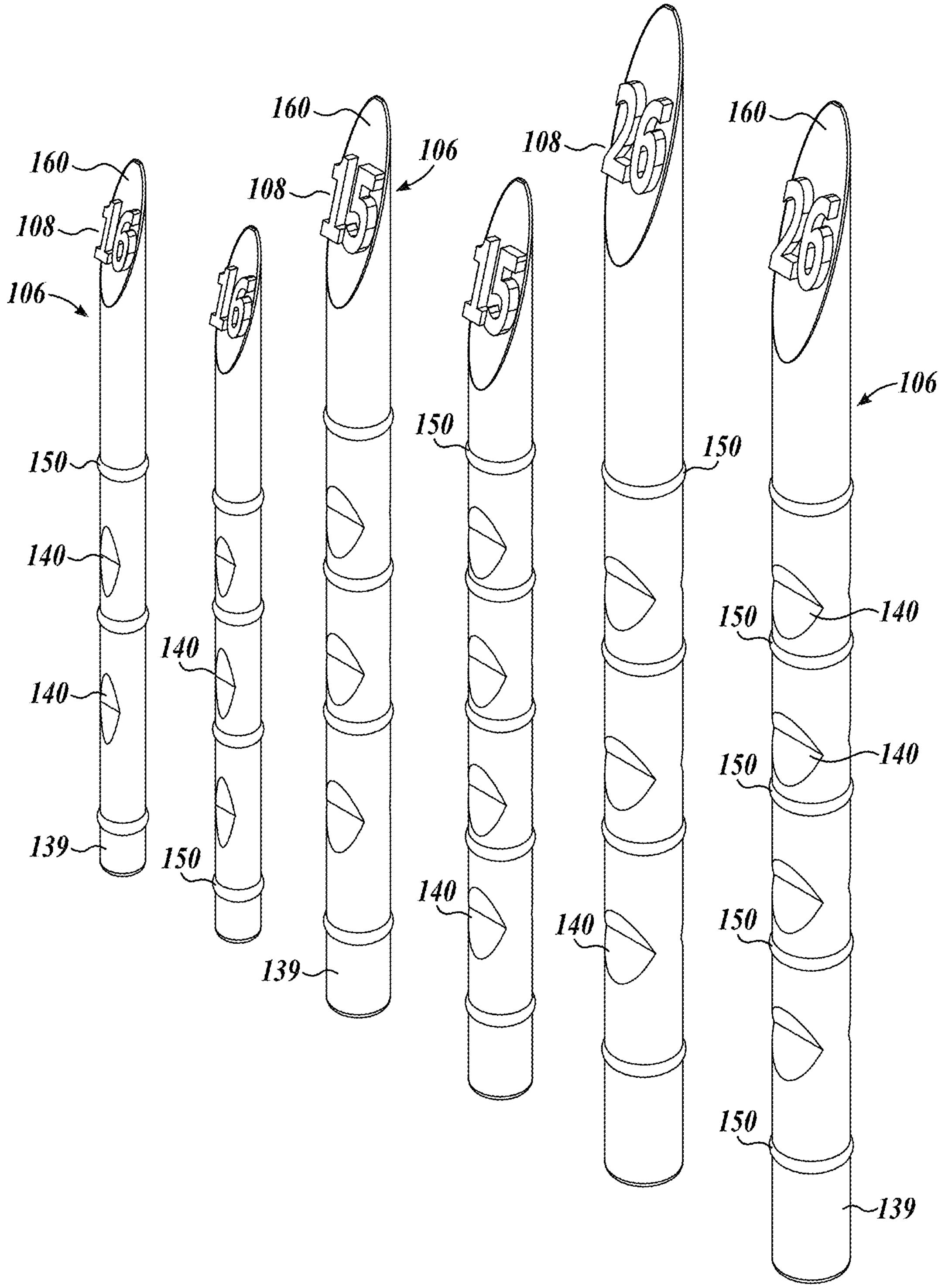
FIG. 4 is a pictorial view a plurality of different sized and configured stems for a socket tool holders.

Also, in FIG. 4 the diameter of the stems designated as "15", for use with a 15 mm socket tool, may be from about 4.2 mm to 4.8 mm in diameter and designed for ⅜th in socket drivers. In this situation, the reduced size sections 140 may be in the form of from about 0.7 mm to about 1.3 mm deep grooves. This depth of the reduced size section grooves 140 is sufficient for the stem to be conveniently severed, but still strong enough to securely support socket tools used with ⅜th inch socket drivers.

Further, in FIG. 4 the diameter of the stems designated as "26", for use with a 26 mm socket tool, may be from about 5.2 mm to about 5.8 mm in diameter and designed for ½ in socket drivers. In this situation, the reduced size sections 140 may be in the form of from about 0.7 mm to about 1.3 mm deep grooves. This depth of the reduced size section grooves 140 is sufficient for the stem to be conveniently severed, but still strong enough to securely support socket tools used with ½ inch socket drivers.

Figure 6:
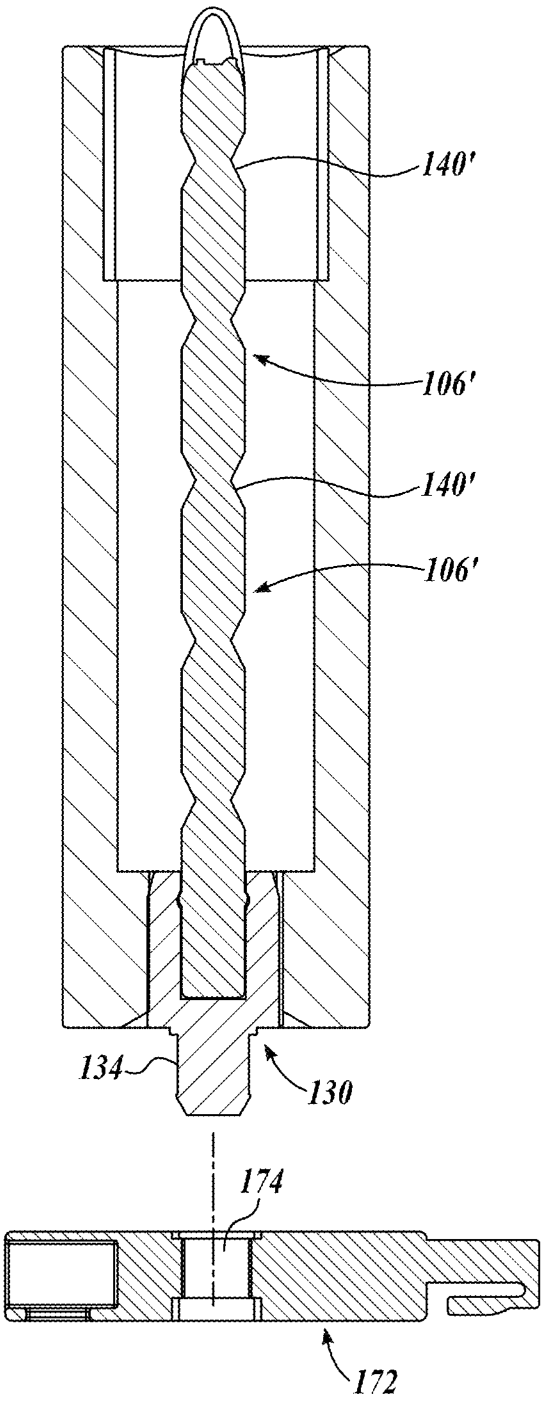
FIG. 6 is an enlarged cross-sectional view of a socket tool holder shown in FIG. 5.

It is to be understood that if the configuration of the reduced size sections 140 is of a form other than the illustrated shallow groove shown in FIG. 4, the depth of the reduced size sections can be selected so that the remaining width or diameter of the stem is approximately the same as when utilizing the shallow grooves discussed above. For example if two diametrically opposite reduced size portions are used, such as shown in FIG. 6 below, then each of the two reduced size sections can be about one-half of the depth of a single reduced size section discussed above.

As shown in the figures, a plurality of optional rings 150 extend around the stems 106. The rings 150 protrude slightly beyond the outer surface of the stems 106 and are sized to be snuggly receivable with an interior groove 152 formed in the inside wall of the opening 136 of stub 134, thereby to help retain the bottom of the stem 106 engaged with the stub 134. It may be the case that the fit between the exterior of the stems 106 and the interior of the opening 136 is sufficiently snug to not require a ring 150 or groove 152.

If the rings 150 are utilized, a ring will be located above each reduced size location 140 as well as below the lower most reduced size location. In this regard, a section of the stem 106 is located below each ring so as to be engaged within the lug 130.

Referring to FIGS. 1A, 1B, 2, and 4, an indicia 108 is located at the upper end of the stem 106 to be visible to users of the socket tool holder 100. The indicia 108 may relate to some function, size or other aspect of the socket tool holder. In FIGS. 1A, 1B, 2, and 4, the indicia pertain to the size of the nut, a bolt, or other hardware to be tightened or loosened by the socket tool 102 engaged with the socket tool holder 100. In this regard, in FIGS. 1A, 1B, and 4, the indicia 108 consists of the designation "15," indicating that the socket tool 102 is sized to engage 15 millimeter nuts, bolts, or other hardware. Similarly in FIGS. 2 and 4, the designation "16," indicates that the socket tool holder 100 is sized to receive a socket tool 102 for tightening or loosening 16 mm nuts, bolts, or other hardware. Similarly in FIG. 4, the designation "26," indicates that the socket tool holder 100 is sized to receive a socket tool 102 for tightening or loosening 26 mm nuts, bolts, or other hardware.

The indicia 108 is located on a slanted surface 160 at the top or tip 160 of the stem 106. The indicia 108 may be integrally formed with the stem 106, or may be structurally separate from the stem and applied to the slanted surface 160 by adhesive or elsewise.

The slanted surface 160 may display other types of indicia, for example, the length of the socket tool 102 or the depth of the socket head 162 formed within the socket tool 102.

In addition, the indicia 108 maybe located elsewhere on the stem 106. For example, the stem 106 may be formed without the slanted surface 160, and the indicia may be located on the exterior side wall of the stem. As another example, the indicia may be located on the top of the stem 106 which is simply blunt or otherwise squared off in the form of a flat top surface.

So as to make the indicia 108 more visible relative to the socket tool holder 100 and in particular relative to the stem 106, the indicia may be of a color, a finish, a texture, or otherwise visually dissimilar or in contrast to the display surface 160 and or the stem 106.

As discussed above, the reduced size sections 140 are provided so that a stem 106 can be conveniently severed at a specific reduced size section to result in the stem being of a desired length. To this end, as an example, a pair of plyers may be used to hold the stem adjacent a specific reduced size section and the stem may be grasped on the opposite side of the reduced size section from the plyers and then the stem may be bent at the reduced size section to sever the stem at the reduced size section.

As another example, a pair of snippers, such as tin snippers, can be used to simply cut through the stem at a desired reduced size section.

As a further example, the stem can be placed within a vice with the desired reduced size section protruding out from the jaws of the vice. The stem can be bent by hand or with a tool, such as a pair of plyers, to sever the stem at the protruding reduced size section.

The socket tool holder 100, including the stem 106 can be composed of numerous materials. Such materials can be composed of, for example, a high strength polymer, such as nylon, polyamideimide (PAI), Polyether ether ketone (PEEK), polyphenylene sulfide (PPS) and polyetherimide (PEI). Other suitable polymer and not-polymer materials can be used to construct the socket tool holder that provide the stem 106 with sufficient strength to hold socket tools, but are also capable of being severed at the locations of the reduced width locations.

Figure 5:
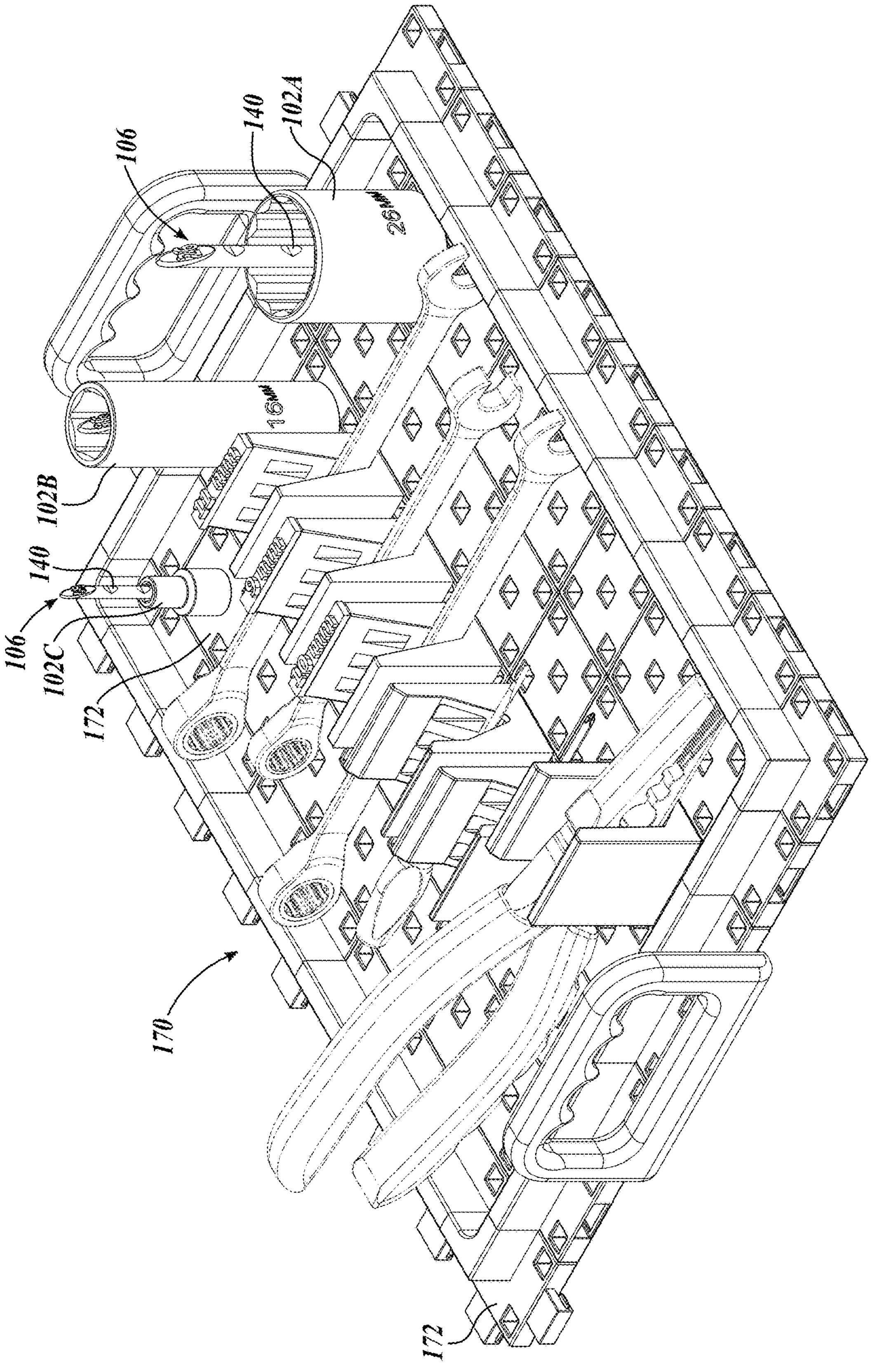
FIG. 5 is a pictorial view of a socket tool holder of the present disclosure shown mounted on a tool tray.

While illustrative embodiments have been illustrated and described, it will be appreciated that various changes can be made therein without departing from the spirit and scope of the invention. For example, as shown in FIGS. 5 and 6, the support structure can be in the form of a tray 170 on to which are engaged mounting lugs, such as lugs 130, for receiving a plurality of socket tools thereon. The tray 170 can be composed of individual panels 172 that lock together to form the base of the tray 170. The panels 172 can include one or more openings 174 for receiving the stub 134 of a lug 130, which in turn receives a stem 106. The tray 170 is shown as holding a number of socket tools, such as socket tools 102A, 102B and 102C. The tray 170 can be configured to hold additional socket tools or alternative socket tools.

Further, as shown in FIG. 6, the stem 106' is shown as constructed with diametrically opposite reduced sized sections 140.' The total depths of the two opposite reduced sized sections can total about the same as the single reduced sized sections 140 shown in FIG. 4.

The embodiments of the invention in which an exclusive property or privilege is claimed are defined as follows:

1. A socket tool holder, comprising a base and an elongate stem having a proximal free end slidably engageable within an opening in the base to extend upwardly from the base, the stem of a width of a size to pass through a socket tool being held, the stem configured with spaced apart reduced size width sections, said spaced apart reduced size width sections extending from the proximal free end of the stem and along the height of the stem to facilitate snapping the proximal end of the stem at a desired reduced size width location relative to the proximal free end of the stem to adjust the stem to a desired length, the resulting proximal free end of the stem engageable with the base.

2. The socket tool holder of claim 1, wherein the reduced size width sections are selected from the group consisting of: a reduced size width section extending across one side of the stem, two reduced sized width sections extending across the side of the stem, a plurality of reduced size width sections extending across the side of the stem, a reduced size width section extending partially around the side of the stem, and a reduced size width section extending completely around the stem.

3. The socket tool holder of claim 2, wherein the reduced size width sections are selected from the group consisting of a groove, a channel, a cut, and a score line.

4. The socket tool holder of claim 1, wherein the stem further comprises an exterior surface and a ring extending at least partially around the stem to protrude from the exterior surface of the stem.

5. The socket tool holder of claim 4, wherein a ring is located between the locations of the reduced size width sections.

6. The socket tool holder of claim 4, wherein a ring is associated with each of the reduced size width sections.

7. The socket tool holder of claim 1, wherein the stem comprises a distal end portion opposite the proximal end portion, the distal end portion configured to receive or display indicia pertaining to the socket tool corresponding to the socket tool holder.

8. The socket tool holder of claim 7, wherein the indicia pertaining to the size of the socket tool held by the socket tool holder.

9. The socket tool holder of claim 7, wherein the distal end portion of the stem is configured as a display surface disposed diagonally relative to the length of the stem, the indicia positioned on the display surface.

10. The socket tool holder of claim 9, wherein the indicia pertaining to the size of the socket tool held by the socket tool holder.

11. The socket tool holder of claim 10, wherein the indicia is mountable on the display surface.

12. The socket tool holder of claim 7, wherein the indicia is mountable on the distal end portion of the stem.

13. The socket tool holder of claim 1, wherein the base including an opening to receive the stem therein.

14. The socket tool holder of claim 13, wherein:

the stem further comprises an exterior surface and a ring extending at least partially around the stem to protrude from the exterior surface of the stem; and the base includes a groove in the base opening to snugly receive the ring therein.

15. The socket tool holder of claim 1, wherein the base comprising lugs sized and shaped to engage with the drive socket of a socket tool.

16. The socket tool holder of claim 15, wherein the lugs comprise an opening for receiving the stem therein.

17. The socket tool holder of claim 16, wherein the lugs are configured to be engageable with a support structure.

18. The socket tool holder of claim 17, wherein the support structure is configured to be connectable to at least one adjacent support structure.

19. The socket tool holder of claim 18, wherein the support structure comprises a platform member and at least one tongue protruding from the platform member to engage with a recess formed in the platform member of an adjacent support structure.

20. The socket tool holder of claim 17, wherein the support structure comprising a tray structure.

* * * * *